United States Patent [19]
Garretson

[11] 3,974,851
[45] Aug. 17, 1976

[54] DEMAND TYPE GOVERNORS

[75] Inventor: Keith H. Garretson, Mt. Pleasant, Iowa

[73] Assignee: Garretson Equipment Co., Inc., Mt. Pleasant, Iowa

[22] Filed: Sept. 19, 1975

[21] Appl. No.: 614,851

Related U.S. Application Data

[63] Continuation-in-part of Ser. No. 438,227, Jan. 31, 1974, abandoned.

[52] U.S. Cl. .................................. 137/494; 48/144; 48/184; 123/120; 128/142 R; 137/495; 137/505.46; 251/58; 261/69 R
[51] Int. Cl.² ........................................ F16K 31/12
[58] Field of Search .............. 48/184, 144; 123/120; 137/494, 495, 505.46, 505.47; 251/58; 261/69 R; 128/142

[56] References Cited
UNITED STATES PATENTS

| | | | |
|---|---|---|---|
| 2,775,981 | 1/1957 | Zonker | 48/184 |
| 2,777,432 | 1/1957 | Ensign | 123/120 |
| 2,787,280 | 4/1957 | Arpin | 128/142 |
| 2,787,286 | 4/1957 | Hansen | 137/495 |
| 3,081,160 | 3/1963 | Ensign | 48/184 |
| 3,242,938 | 3/1966 | Smilg et al. | 137/505.46 |
| 3,540,419 | 11/1970 | Fox | 123/120 |

Primary Examiner—Robert L. Lindsay, Jr.
Assistant Examiner—George C. Yeung
Attorney, Agent, or Firm—Haven E. Simmons; James C. Nemmers

[57] ABSTRACT

A demand type governor for gaseous fuel internal combustion engines, various kinds of breathing and heating apparatus and similar applications features a diaphragm controlled inlet valve having two different rates of opening movement for a given rate of movement of the diaphragm producing a relatively small amount of valve movement in relation to diaphragm movement for instances of lower demands and a relatively larger amount of valve movement in relation to diaphragm movement for instances of higher demands, all by means of a lever-fulcrum arrangement having a higher mechanical advantage in the first instances and a lower mechanical advantage in the second instances. Other features of the governor help assure its uniform, relatively frictionless operation, and its ease and economy of manufacture.

10 Claims, 8 Drawing Figures

U.S. Patent  Aug. 17, 1976  Sheet 1 of 2  3,974,851
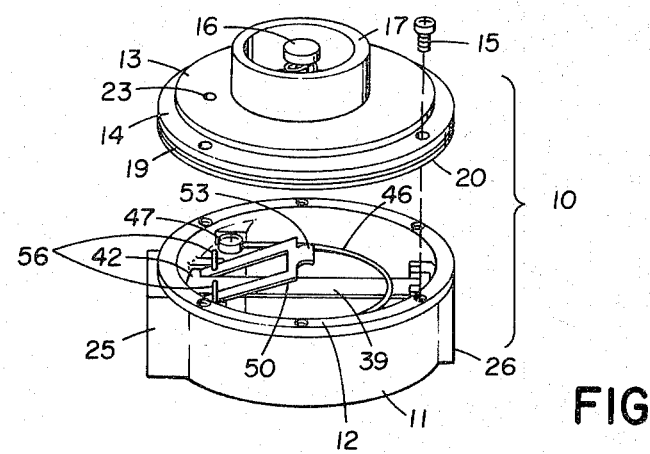
FIG 1
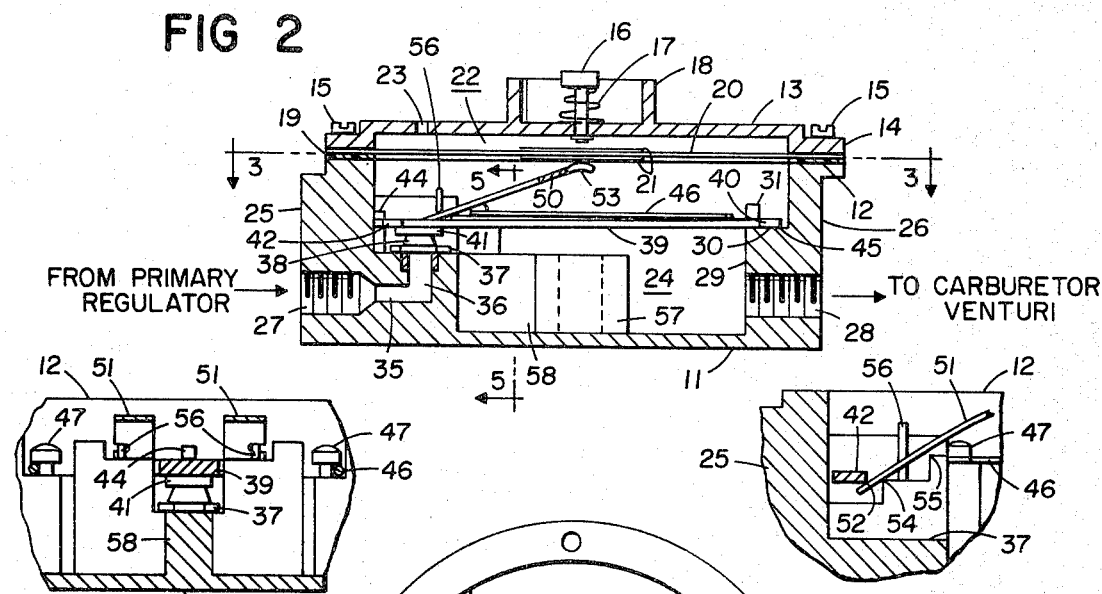
FIG 2
FROM PRIMARY REGULATOR →
→ TO CARBURETOR VENTURI
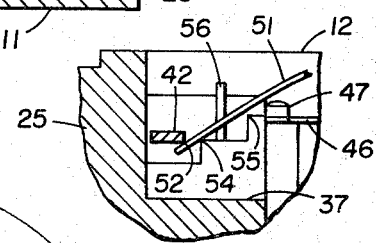
FIG 5
FIG 4
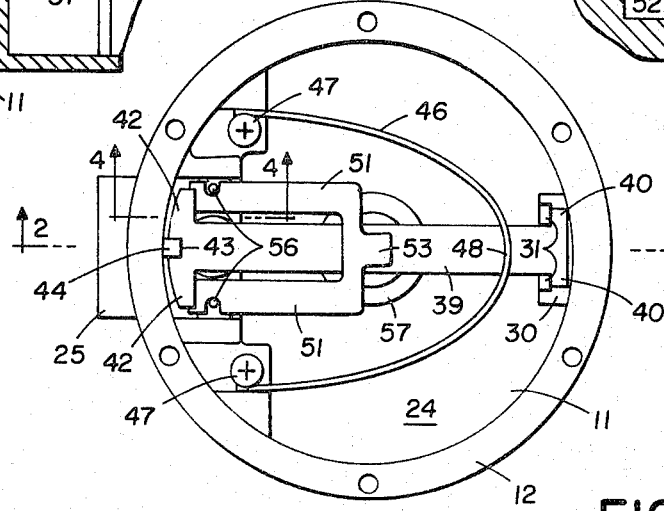
FIG 3

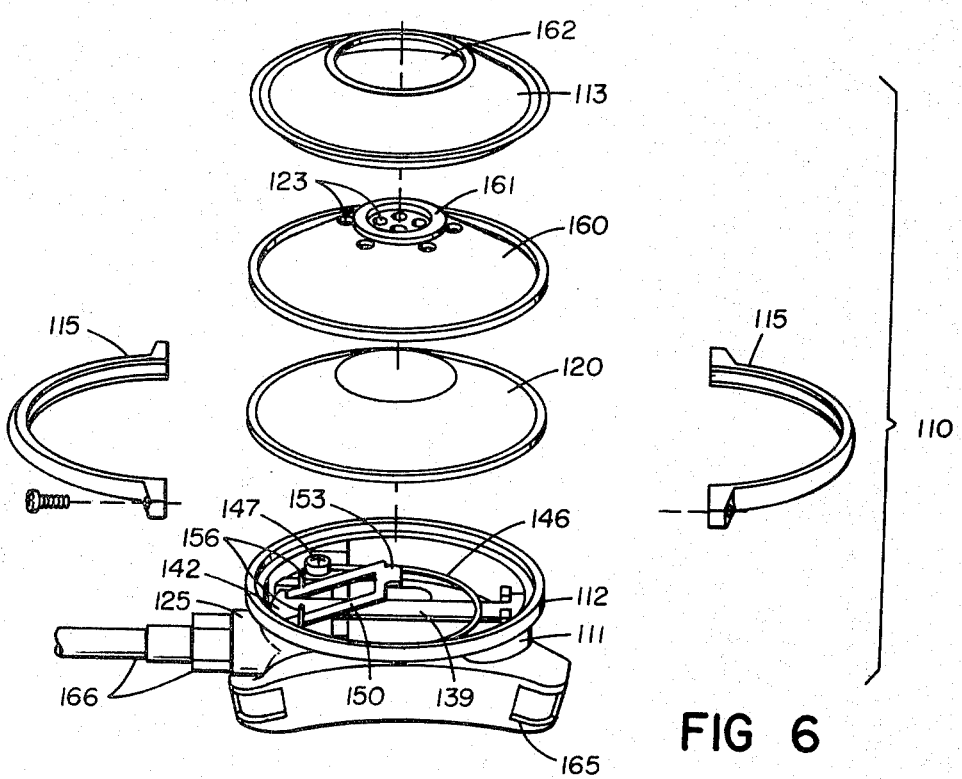
FIG 6
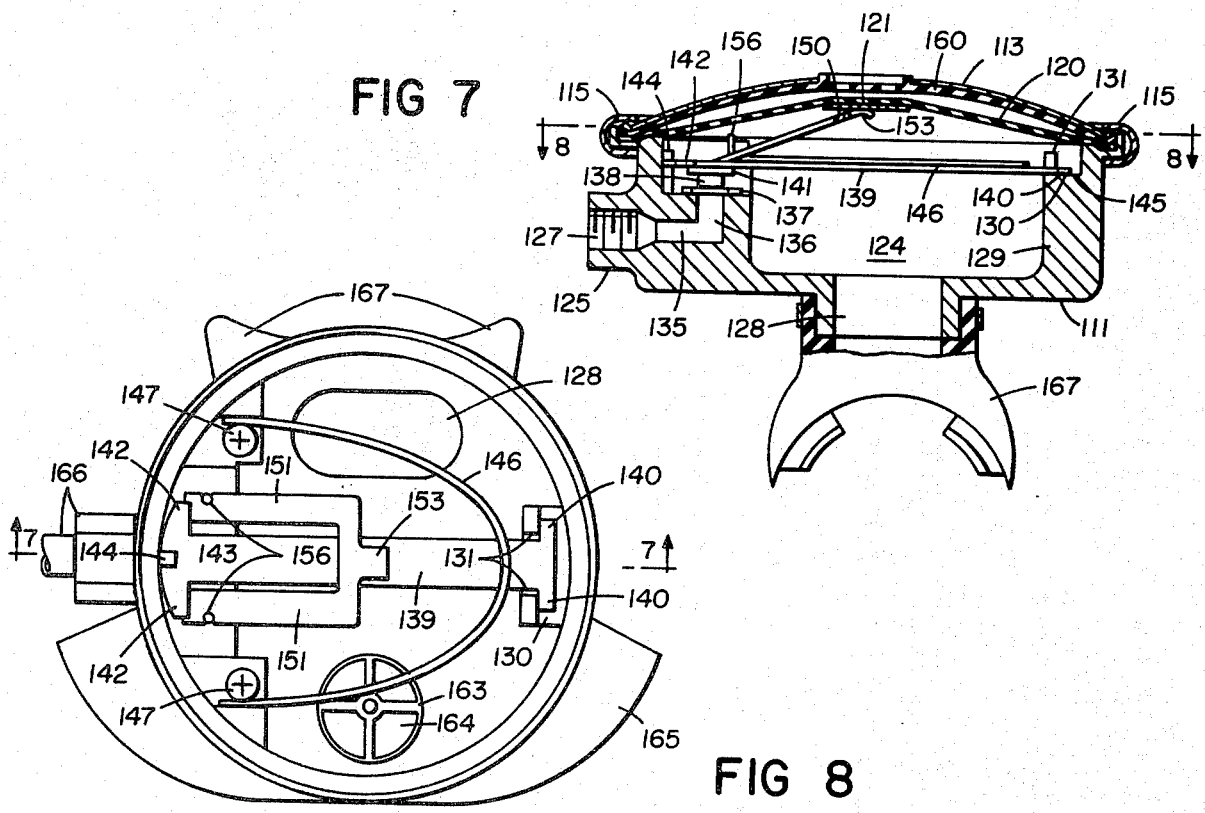
FIG 7
FIG 8

DEMAND TYPE GOVERNORS

CROSS REFERENCE TO RELATED APPLICATION

This application is a continuation-in-part of application Ser. No. 438,227, filed Jan. 31, 1974, now abandoned.

BACKGROUND OF THE INVENTION

As is well known, in gaseous fuel carburetors, the fuel bowl, the needle valve and seat, and the float of the liquid fuel type carburetor are in effect replaced by a zero or low pressure demand type governor. A primary pressure regulator reduces the high gas pressure, such as that of L-P gas, to a relatively constant, low pressure, e.g. 6 p.s.i.g. Gas at the latter pressure is led into the demand governor to a valve which, as closely as possible, is biased just enough to maintain it in its closed position against the pressure of the gas at the valve seat. The valve is activiated usually by a diaphragm controlled linkage, one side of the diaphragm being open to the atmosphere, or to the throat of the carburetor up-stream of the venturi or other point relied upon to meter the fuel, and the other to the venturi itself or other metering point, as the case may be. When there is no pressure drop through the carburetor, the valve remains closed inasmuch as the pressures on both sides of the diaphragm are equal. When the engine is operating, the pressure drop through the carburetor creates a pressure differential between the two sides of the diaphragm, causing it to flex and the linkage to open the valve to admit gas to the carburetor. Since the extent of the valve opening is governed by the amount of movement of the diaphragm, and that upon the pressure differential between its two sides, and since the pressure differential in turn depends upon the speed of and load on the engine, proper proportionate amounts of gas are fed to the carburetor for varying engine speeds and loads.

Obviously, in order for the engine to function properly, the demand governor must be as sensitive and as proportionally constant in operation, with as little friction in the linkage, as is possible. Unfortunately, an arrangement which provides good, sensitive operation of the governor at idle and low engine speeds and/or loads tends not to provide the same at higher engine speeds and/or loads, and vice versa. The primary reason for this in most current governors is that the linkage interconnecting the diaphragm and the valve provides a relatively fixed amount of valve movement for a given amount of movement of the diaphragm regardless of whether the engine speed and/or load is low or high. If the valve movement is right for higher speeds and/or loads, it tends to be too much and too insensitive for low speeds and/or loads; if it is right for low speed and/or loads, it tends to be too little for higher speeds and/or loads. Furthermore, friction in the linkage also tends to upset proper movement of the valve, especially at low engine speeds and/or loads, and the bias on the valve towards its closed position, generally by means of a spring arrangement, tends to vary depending upon the degree to which the valve is open, whereas it should be constant as possible no matter how much or little the valve is open. Finally, the design of the demand governor should contribute towards ease and economy of its manufacture and assembly, using as simple and few parts as possible. The foregoing requisites and considerations are also generally applicable to demand type governors used to supply fuel to the burners of heating apparatus and the like.

The operation and requirements of demand type governors used for breathing purposes in "hostile atmospheres", e.g., aqua-lung diving apparatus and mine safety, firefighting and aircraft or high altitude breathing apparatus, are likewise essentially the same as those for internal combustion engine. In the breathing type apparatus, the compressed air stored in tanks is also first led through a primary type regulator before being presented to the demand governor through which the user breathes. The primary regulator reduces the high pressure air to a relatively constant low pressure at the governor in the case of breathing apparatus used adjacent ground level, to progressively lower pressures at the governor in the case of that for ascending in the atmosphere, and to progressively higher pressures at the governor in the case of that for descending in water, in order to balance the decreasing ambient pressures of the air and the increasing ambient pressure of the water, respectively. Here too, especially, the governor must be as sensitive and proportionally constant in operation as possible as the demands upon it range from low to high. If too much effort upon inhalation is required to open the inlet valve, the user, be he diver, fireman, pilot or whatever, may often unduely tire or frighten, as much for pyschological as for physiological reasons. Yet at the same time, the inlet valve must be able to open quickly and sufficiently to provide for large and rapid breathes. All of these aspects, as in governors for internal combustion engines, are affected by the nature of the valve operating mechanism and the uniformity of the bias on the inlet valve. Lack of friction and ruggedness of structure are especially important in breathing apparatus which particularly dictate that the governor have a minimum number of parts and interconnections between them. As in the case of internal combustion engines, it should also be easy and economical to manufacture and assemble.

Accordingly, the primary objects of the present invention are to provide governors of the nature described in which the demands of low and high operating conditions are better accommodated, in which friction between the parts is reduced, in which the closing bias on the inlet valve is uniform regardless of the degree of valve opening, which is simple and rugged in structure, and which is easy and economical to manufacture and assemble.

SUMMARY OF THE INVENTION

The objects of the invention are achieved in the demand governors of the type concerned by interconnecting the diaphragm and the valve by an actuating lever having two fulcrum points provided by the edges of a pair of steps within the governor housing. The first produces relatively small, sensitive openings of the valve from its closed position for relatively large movements of the diaphragm in order to accommodate idle and low engine speeds and loads or initial inhalation, depending upon the application. After the valve is opened a given amount, the second fulcrum point becomes operative and thereafter produces faster and larger openings of the valve for the same amount of diaphragm movement in order to accommodate higher engine speeds and loads or large and rapid inhalation, again depending upon the application. In other words, the first fulcrum point produces a higher mechanical advantage but a lower opening rate and the second fulcrum point a lower mechanical advantage but a higher opening rate. Differential rates of fluid supply have been employed in demand governors for internal combustion engines (see U.S. Pat. No. 2,787,286 using an auxiliary booster valve) and in diving apparatus (see U.S. Pat. No. 3,242,938 using a camming and compound linkage arrangement) but only at the expense of considerable complexity, and thus cost and reliability, as compared with the simpler and more direct approach of the present invention.

The inlet valve in the governors of the present invention includes a relatively lengthy valve arm extending the full width of the governor housing, the latter being a simple die casting. One end of the arm overlies a valve seat near the inner wall of the housing and is provided with a disc of sealing material, one end of the valve actuating lever passing under the arm adjacent the valve seat. The other end of the arm simply lies atop a flat ledge adjacent the opposite wall of the housing which provides a knife-edge pivot point with the adjacent end edge of the arm about which the arm tilts to open and close the valve at the other end of the arm. The length of the arm and its guides assures that the disc of sealing material always contacts the valve seat orifice squarely and at a constant location on the face of the disc. Hence the need for plunger type valves which are customarily used to achieve uniform valve sealing and seating is eliminated and thus, too, the inherent friction between plunger type valves and the guide sleeves or bores required for them.

Adjacent the pivot point of the valve arm, the bight of a U-shaped spring presses down on the arm just sufficiently to hold the valve closed against the pressure of the incoming gas or air. The spring also extends across the housing, its ends being anchored to the housing adjacent the valve seat. Hence, movement of the spring between the valve closed and fully open positions is relatively slight and this coupled with the spring's comparatively extensive length assures a substantially constant spring pressure upon the valve arm at all times. In addition, the pivot point between the valve actuating lever and the valve arm, as well as the fulcrum points for the former, are also all knife-edge in form, while the diaphragm merely depresses the other end of the actuating lever without being otherwise attached thereto, so that friction between the parts is minimal. While a version of knife-edge fulcrums is currently used for the valve actuating lever in one type of demand governor for diving purposes, such fulcrums have not, so far as is known, also been used for the valve itself. Finally, the number of parts in the present governors is also minimal and all are relatively simple to fabricate and assemble.

Other features and advantages of the present invention will become apparent from the more detailed description which follows and the accompanying drawings.

BRIEF DESCRIPTION OF THE DRAWINGS

FIG. 1 is an upper, isometric view of a demand type governor for an internal combustion engine according to the present invention shown in partially exploded fashion.

FIG. 2 is a sectional view of the governor of FIG. 1 assembled taken along the line 2 — 2 of FIG. 3 but with the diaphragm and housing cover in place.

FIG. 3 is a plan view of the governor of FIG. 1 taken along the line 3 — 3 of FIG. 2.

FIG. 4 is a detail view in section taken along the line 4 — 4 of FIG. 3 and illustrating the two fulcrum points for the valve actuating lever.

FIG. 5 is a detail view in section taken along the line 5 — 5 of FIG. 2.

FIG. 6 is an upper, isometric view of a demand type governor for breathing apparatus, particularly an aqualung for diving, according to the present invention shown in partially exploded fashion.

FIG. 7 is a sectional view of the governor of FIG. 6 assembled taken along the line 7 — 7 of FIG. 8 but with the diaphragms and housing cover in place.

FIG. 8 is a plan view of the governor of FIG. 6 taken along the line 8 — 8 of FIG. 7.

DETAILED DESCRIPTION OF THE PREFERRED EMBODIMENTS

Turning first to a demand type governor for internal combustion engines, as shown in FIGS. 1 - 5, the governor, generally designated at 10, consists of an open top, cylindrical housing 11 provided with a laterally extending flange 12 about its mouth and a cover plate 13, upwardly dished above a complementary flange 14 and removably secured to the housing 11 by means of screws 15. The housing 11 and cover 13 may be die cast from a suitable aluminum alloy and require a minimum of machining and other operations to put them in finished form. Centrally through the cover 13 is mounted a priming plunger 16, spring loaded at 17, and exteriorly protected by an annular wall 18 integral with the top face of the cover 13. Between the flanges 12 and 14 is sandwiched an annular gasket 19 and thereabout a thin, flexible diaphragm 20 of relatively limp material, the central portion of which is itself sandwiched between a pair of small fiber discs 21, the upper one of which receives the plunger 16 when depressed in order to move the diaphragm 20 downwardly. The cover 13 and the diaphragm 20 below it thus form a chamber 22 which is vented through a port 23 to the atmosphere or to the throat of the carburetor upstream of the point relied upon to meter the fuel, while the housing 11 below the diaphragm 20 forms another chamber 24 separated from the first by the diaphragm 20.

The exterior peripheral wall of the housing 11 is provided with a pair of opposite rectangular bosses 25 and 26. The former is drilled and tapped to form a gas inlet 27 which is connected to the outlet of the primary governor (not shown). The latter boss 26 is also drilled and tapped to form a gas outlet 28 which is connected to the venturi or other fuel metering point of the carburetor (not shown). The outlet 28 opens into the interior of the housing 11 through an internal boss 29 whose top is formed to provide a flat ledge 30 and a pair of square posts 31 spaced laterally to each side of the axis of the outlet 28 and inwardly from the peripheral wall of the housing 11. The inlet 27 opens into a horizontal passage 35 and the latter into a vertical passage 36 formed in an interior structure in the chamber 24 cast integrally with the housing 11. The vertical passage 36 opens through a flat ledge 37 and threadedly receives a valve seat 38 having a planar valve orifice opening up into the housing chamber 24. An elongated, flat valve arm 39 extends horizontally across the interior of the housing chamber 24, one end of the arm 39 passing the posts 31 and having a pair of laterally projecting ears 40 which lie atop the ledge 30 and are retained between the posts 31 and the adjacent peripheral wall of the housing 11. To the underside of the arm 39 adjacent its other end is secured a disc of elastomeric material which engages the valve seat 38 to provide a valve 41, the levels of the ledge 30 and the orifice of the valve seat 38 being such that the disc of the valve 41 lies squarely on the orifice when the ears 40 lie flat upon the ledge 30. The arm 39 beyond the valve 41 terminates in a second pair of laterally extending ears 42 which are spaced above the adjacent portion of the interior structure of the chamber 24 and laterally located by a notch 43 intermediate the ends of the ears 42 and a lug 44 cast on the interior of the adjacent peripheral wall of the chamber 24. Hence, when the ears 42 are lifted, the valve arm 39 and valve 41 are raised from the valve seat 38, the edges of the ears 40 at the other end of the arm 39 tilting on the ledge 30 to provide in effect knife-edge pivot points 45 about which the arm 39 operates to open and close the valve 41. The valve arm 39 is biased to its valve closed position by a U-shaped wire spring 46 whose ends are anchored beneath screws 47 tapped into the interior structure of the chamber 24 at locations adjacent but laterally well spaced from the ends of the ears 42. The spring 46 extends horizontally across the interior of the chamber 24 so that its bight 48 engages the upper face of the arm 39 adjacent the posts 31.

The valve arm 39 is actuated by a flat U-shaped lever 50 straddling the arm 39 with the ends of its legs 51 extending down under and engaging the ears 42 at pivot points 52 as shown in FIGS. 3 and 4. The lever 50 inclines upwardly therefrom toward the center of the chamber 24 and its bighted end is provided with a centrally located, downturned tang 53 in contact with the lower disc 21 on the diaphragm 20 below the plunger 16. The lever legs 51 successively rock about a pair of fulcrums 54 and 55 formed by the edges of a pair of steps machined or cast into the interior structure of the chamber 24 above and to each side of the valve seat 38, the fulcrums 54 being closer to the pivot points 52 and lower than are the fulcrums 55, all as shown in FIGS. 4 and 5. The parts are arranged so that when the lever 50 is in its static position and the diaphragm 20 is unflexed, the lever legs 51 engage the fulcrums 54 but not the fulcrums 55, yet when the tang 53 is depressed by the diaphragm 20 beyond a certain point the lever legs 51 shift from the fulcrums 54 to the fulcrums 55, as will be clear from FIG. 4. In order to locate the lever 50 positively, the outboard edges of its legs 51 are notched to receive upstanding pins 56 pressed into the top faces of the steps forming the lower fulcrums 54. So that other engine locations for the governor 10 can be accommodated, the floor of the chamber 24 is provided with a centrally located, integral annular boss 57, connected to the ledge 37 by a web 58, which may be drilled and tapped to provide an alternate fuel outlet.

The pressure of the spring 46 upon the valve arm 39 is adjusted so that the valve 41 is just maintained closed against the pressure of the gas in the inlet passage 36, which pressure is predetermined by the output of the primary governor to which the fuel inlet 27 is connected. When the fuel outlet 28 in turn is connected to the venturi or other fuel metering point of the carburetor and the engine is operating at idle speed or light load, the pressure drop through the venturi of course results in a pressure in the chamber 24 less than the pressure in the chamber 22. The diaphragm 20 is therefore flexed downwardly, depressing the valve lever tang 53 and causing the legs 51 of the valve lever 50 to rock about the fulcrums 54 and lift the valve arm 39 against the spring 46. The valve 41 is thus held open sufficiently to admit fuel into the chamber 24 and thence through the fuel outlet 28 to the carburetor. As the engine throttle is opened, the pressure differential between the chambers 22 and 24 increases causing the diaphragm 20 and lower 50 to open the valve 41 still further. Note that the pivot points 52 and the fulcrums 54 are relatively very close together so that the relatively large amounts of movement of the diaphragm 20 which occur even at idle and low engine speeds and/or loads produce relatively small and sensitive amounts of movement of the valve 41 under these conditions. Contributing to this in the length of the valve arm 39 itself and the relatively large distance between the pivot points 45 at one end of the arm 39 and the valve 41 at the other. At the same time, the length of the valve arm 39 assures that the valve 41 always sits squarely on the flat orifice of the valve seat 38 so that the pressure on the valve 41 is distributed equally. The posts 31 and the arm locating ears 40 and notch 43, in turn assure that the identation in the face of the disc of the valve 41 caused by the orifice of the seat 38 always contacts the latter in the same place.

As the throttle is opened still further, additional movement of the diaphragm 20 owing to the further increased pressure differential causes the lever legs 51 to shift from the fulcrums 54 to the fulcrums 55 where they remain throughout the remainder of the throttle opening. Since the fulcrums 55 are more remote from the pivot points 52, the movement of the valve arm 39 and 41 is more rapid and larger for a given movement of the diaphragm 20 than when the fulcrums 54 are operative. Hence, the two fulcrums 54 and 55 provide two different mechanical advantages for the valve arm 39 and hence two different amounts or rates of opening movement of the valve 41 for a given amount or rate of movement of the diaphragm 20; small, sensitive movements to best accommodate idle and low speed and/or load engine operation, and larger, more rapid movements required for higher engine speeds and/or loads. If desirable or necessary, of course, additional fulcrum points could be similarly incorporated to provide a whole range of rates of valve opening for a given rate of diaphragm movement. When starting the engine from rest, the plunger 16 may be depressed in order to prime the engine, the plunger 16 thus acting analogously to the choke in a liquid fuel carburetor.

Since the pivot points 45 and 52 and the fulcrums 54 and 55 are knife-edge contacts, friction between the parts is at a minimum, especially as compared with the journal type pivots often used in governors of this type. Note also that, inasmuch as the spring 46 acts upon the valve arm 39 close to the pivot points 45, the amount of movement of the spring 46 is relatively slight throughout the entire range of movement of the arm 39 from the closed to the maximum open position of the valve 41. The spring 46 thus exerts practically a constant pressure upon the valve arm 39 so that engine demands transmitted to the diaphragm 20 are faithfully conveyed to the valve 41 at all times without the distortion which would tend to occur were the spring pressure to vary with the amount of movement of the valve arm 39. As will be apparent to those skilled in the art, the structure and operation of a demand type governor according to the invention for metering gaseous fuel to a burner in heating apparatus would be essentially identical to the foregoing.

Turning next to a demand type governor for breathing apparatus, the present invention is shown in FIGS. 6–8 incorporated into the second stage of a well-known make of aqua-lung equipment for diving. Those parts of the latter which are identical or essentially identical in structure and function with those in FIGS. 1 – 5 are given corresponding reference numerals but with "100" added thereto. The following additional description, taken in conjunction with that for FIGS. 1 – 5, will suffice in the case of the embodiment in FIGS. 6 – 8 for those skilled in the art.

The diaphragm 120 of the governor 110, which diaphragm is of somewhat heavier material than the diaphragm 20 in FIGS. 1 – 5, seats within a lipped flange 112 about the mouth of the housing 111. The diaphragm 120 is overlaid by a purge diaphragm 160 perforated at 123 in its central area and equipped there with a purge button 161. The diaphragm 160 is overlaid in turn by a metal cover plate 113, apertured at 162 to expose the perforation 123 and the purge button 161, the cover plate 113 and the diaphragms 120 and 160 being secured to the housing flange 112 by the two halves of a split clamp ring 115. Hence the outer face of the diaphragm 120 communicates with ambient pressure through the perforations 123 in the purge diaphragm 160. When the purge button 161 is pushed, it in turn moves the diaphragm 120 against the tang 153 of the valve actuating lever 150 to admit air into the housing chamber 124 and expel any water therefrom through the exhaust outlet 163 in the bottom of the housing 111 for exhaled air which is fitted with the customary one-way flap valve 164 and exhaust Tee 165. The housing boss 125 contains the inlet 127 which receives air from the primary regulator (not shown) through a hose and fitting 166, which air is admitted to the inlet valve 141. The flanged outlet 128 for inhalation from the housing chamber 124 is located in the bottom of the housing 111, opposite the exhaust outlet 163, and over its exterior is fitted a typical mouth-piece 167 for the diver.

The tension of the spring 146 upon the valve arm 139 is also preferably set so that the valve 141 is just held closed against the pressure of the air at the inlet 127. If desired, of course, an arrangement could be provided so that the tension of the spring 146 can be manually adjusted during actual diving, inasmuch as some divers prefer more or less breathing effort to open the valve 141. As the diver descends or ascends, the water pressure on the outer face of the diaphragm 120 increases or decreases, which increases or decreases are balanced by corresponding increases or decreases in the pressure of the air in the chamber 124 as the diver breathes, all owing to the action of the primary regulator which varies the air pressure in the hose 166 to balance the pressure of the ambient water. Then, as the diver breathes through the mouth-piece 167, the consequent reduction in the balancing pressure in the chamber 124 causes the diaphragm 120 to flex inwardly and the valve lever 150 and arm 139 to open the valve 141 against the spring 146. The action of the latter is inaffected by the varying pressures in the chamber 124 and the inlet 127 since the effect of those pressures upon the valve arm 139 cancel each other out. The operation of the remainder of the governor 110 will be apparent to those skilled in the art, as essentially like that of the governor 10, it being understood that views through FIGS. 7 and 8 equivalent to FIGS. 4 and 5 would be identical insofar as the remaining parts and their functions are concerned. It will also be apparent that the structure and operation of a demand type governor according to the invention for breathing apparatus for surface or high altitude use would be essentially like that for diving.

Finally, observe in the case of both governors 10 and 110 how few in number the parts are and how easily they can be fabricated by the relatively simple operations of die casting, stamping, bending and the like. Notice, too, that their assembly does not require skilled labor or expensive jigs and fixtures. All of these features contribute to provide demand type governors which are low in cost and robust in construction, as well as reliable in operation. The present invention, as will also be apparent, is susceptible of embodiment in forms other than those shown and described, so that though the two particular embodiments presented are the best modes known of carrying out the invention, it is not limited to these embodiment alone, instead, the following claims are to be read as encompassing all adaptations and modifications of the invention falling within its spirit and scope.

I claim:

1. In a demand pressure governor for supply of gaseous fluid, the governor including a housing having a gaseous fluid inlet thereto and a gaseous fluid outlet therefrom, the inlet being communicable with a source of gaseous fluid having a first fluid pressure and terminating within the housing in valve means movable to provide valve closed and increasing valve open positions; means effective to bias the valve means to the valve closed position; pressure responsive means movable in response to pressures communicable to the housing through the fluid outlet less than a second fluid pressure; and valve actuating means associated with the valve means and the pressure responsive means for moving the valve means against the biasing means from the valve closed position to increasing valve open positions as the pressure in the housing decreases through the fluid outlet from the second fluid pressure, the improvement wherein the valve actuating means provides the valve means with at least two different rates of valve opening movement for a given rate of movement of the pressure responsive means, said valve opening rates comprising a lesser rate of movement between the valve closed position and an intermediate valve open position, and a greater rate of movement between said intermediate position and subsequent increasing valve open position, the valve actuating means including: valve lever means having first and second fulcrum points disposed between first and second spaced locations thereon, the first lever location being operatively associated with the valve means and the second lever location operatively associated with the pressure responsive means, the lever means being mounted for rocking movement successively about the first and second fulcrum points.

2. The governor of claim 1 wherein the lever means comprises a lever member having said first and second locations and said first and second fulcrum points spaced longitudinally thereof, the first fulcrum point being closer to the first lever location than is the second fulcrum point, the first lever location engaging the valve means and providing a first pivot point with respect thereto, the second lever location engaging the pressure responsive means.

3. The governor of claim 2 wherein the valve means includes a valve seat and an elongated valve arm having means adjacent a first end thereof in sealing contact with the valve seat when the valve assembly is in the valve closed position, the biasing means being operative upon the valve arm and against the first fluid pressure in the fluid inlet, the first location on the valve lever engaging the valve arm adjacent the first end thereof to provide said first pivot point, the valve arm being mounted adjacent a second end thereof to provide a second pivot point about which the arm and sealing means are movable toward and away from the valve seat to provide said valve positions upon movement of the pressure responsive means and the valve lever.

4. The governor of claim 3 wherein the pressure responsive means comprises a flexible diaphragm having first and second faces and sealed thereabout to the housing, the first diaphragm face being subject to the second fluid pressure but not said decreases thereof, the second diaphragm face being subject to both the second fluid pressure and said decreases thereof.

5. The governor of claim 4 wherein the second face of the diaphragm forms one wall of a chamber in the housing communicating with the fluid inlet and outlet and subject to both the second fluid pressure and said decreases thereof, the valve seat, the sealing means, the valve lever and the valve arm being all disposed in the chamber, the central portion of the diaphragm being operative upon the second lever location to rock the lever successively about the first and second fulcrum points and move the valve arm to said valve positions upon said pressure decreases in the chamber.

6. The governor of claim 5 wherein said fulcrum and pivot points are provided by knife-edge contacts.

7. The governor of claim 6 wherein the valve seat comprises an orifice having an exposed planar periphery, and the sealing means includes an elastomeric member having a planar face engageable with the orifice periphery to close the valve.

8. The governor of claim 7 wherein the biasing means is disposed in the chamber and is operative upon the valve arm adjacent the second end thereof.

9. The governor of claim 8 wherein said arm ends are disposed adjacent respective opposite wall portions of the housing chamber, the arm having a pair of opposite faces, one of the arm faces carrying the valve sealing means, and wherein the biasing means comprises a generally U-shaped spring member anchored at its free ends to the chamber adjacent to the first arm end, the bight of the spring member being operative against the other arm face adjacent the second arm end.

10. The governor of claim 9 wherein the valve arm and the housing chamber each includes integral cooperative guide means for the valve arm providing a substantially constant path of travel for the valve arm during the movement thereof between said valve positions.

* * * * *